United States Patent
Randazzo et al.

(10) Patent No.: US 11,982,242 B2
(45) Date of Patent: May 14, 2024

(54) DETERMINATION OF OPENING CHARACTERISTICS OF A FUEL INJECTOR

(71) Applicant: BORGWARNER LUXEMBOURG AUTOMOTIVE SYSTEMS SA, Bascharage (LU)

(72) Inventors: Stéphane Randazzo, Fameck (FR); Cédric Bourgeois, Thionville (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 17/642,018

(22) PCT Filed: Aug. 26, 2020

(86) PCT No.: PCT/EP2020/073794
§ 371 (c)(1),
(2) Date: Mar. 10, 2022

(87) PCT Pub. No.: WO2021/047906
PCT Pub. Date: Mar. 18, 2021

(65) Prior Publication Data
US 2024/0044297 A1    Feb. 8, 2024

(30) Foreign Application Priority Data

Sep. 11, 2019 (FR) .................................... 1910017

(51) Int. Cl.
*F02D 35/02* (2006.01)
*F02D 41/14* (2006.01)
*F02D 41/24* (2006.01)

(52) U.S. Cl.
CPC ....... *F02D 35/027* (2013.01); *F02D 41/1498* (2013.01); *F02D 41/2467* (2013.01); *F02D 2200/0618* (2013.01)

(58) Field of Classification Search
CPC . F02D 35/027; F02D 41/1498; F02D 41/2467
See application file for complete search history.

(56) References Cited

U.S. PATENT DOCUMENTS

| | | |
|---|---|---|
| 5,739,417 A | 4/1998 | Grob et al. |
| 5,747,684 A | 5/1998 | Pace et al. |

(Continued)

FOREIGN PATENT DOCUMENTS

| | | |
|---|---|---|
| DE | 19536110 A1 | 4/1997 |
| DE | 102011008907 A1 | 11/2011 |

(Continued)

OTHER PUBLICATIONS

Machine assisted English translation of JP2011149364A obtained from https://patents.google.com/patent on Jun. 20, 2023, 8 pages.

(Continued)

*Primary Examiner* — George C Jin
(74) *Attorney, Agent, or Firm* — WARNER NORCROSS + JUDD LLP

(57) ABSTRACT

A determination method of opening characteristics of a fuel injector in an internal combustion engine comprising a knock sensor capable of generating a signal representative of vibrations. The knock sensor is used to determine the opening characteristics of the fuel injector. The determination method comprises acquiring the knock sensor signal over a predetermined measurement window synchronised on an injection control signal; and analysing the sensor signal over the measurement window in order to determine a first alternation of a first wave train and to determine the local maximum of the first alternation. The fuel injection is controlled based on the opening characteristic of the injector determined based on this local maximum.

12 Claims, 3 Drawing Sheets

(56) References Cited

U.S. PATENT DOCUMENTS

| | | | | |
|---|---|---|---|---|
| 2012/0247428 | A1* | 10/2012 | Grimminger | F02D 41/2438 123/472 |
| 2016/0160791 | A1* | 6/2016 | Fritz | F02D 41/3094 123/486 |
| 2019/0195148 | A1* | 6/2019 | Ono | F02D 35/028 |
| 2020/0003145 | A1* | 1/2020 | Sugano | F02D 35/028 |

FOREIGN PATENT DOCUMENTS

| | | |
|---|---|---|
| DE | 102010040622 A1 | 3/2012 |
| DE | 202013104714 U1 | 10/2013 |
| EP | 2884084 A2 | 6/2015 |
| EP | 3032077 A1 | 6/2016 |
| GB | 2566736 A | 3/2019 |
| JP | 2011149364 A | 8/2011 |

OTHER PUBLICATIONS

English translation of International Search Report for PCT/EP2020/073794 dated Oct. 26, 2020, 2 pages.
Machine assisted English translation of DE102011008907A1 obtained from https://patents.google.com/patent on Mar. 4, 2022, 9 pages.
Machine assisted English translation of DE102010040622A1 obtained from https://patents.google.com/patent on Mar. 4, 2022, 9 pages.
Machine assisted English translation of DE202013104714U1 obtained from https://patents.google.com/patent on Mar. 4, 2022, 7 pages.

* cited by examiner

DETERMINATION OF OPENING CHARACTERISTICS OF A FUEL INJECTOR

TECHNICAL FIELD

The present invention relates generally to the field of the fuel injection in internal combustion engines, and more particularly to determining opening characteristics of a fuel injector.

STATE OF THE ART

The modern fuel injection systems typically employ electro-mechanically controlled fuel injectors, for example by solenoid actuators, which allow control of the opening and closing of the injector by the needle lift, in order to inject fuel into the combustion chamber. Depending on the type of engine, the needle can be controlled directly by the actuator (e.g. gasoline engine) or controlled hydraulically by means of a chamber whose filling is controlled via the actuator, thus making an indirect control.

In general, there is an offset between the start of the injector control signal (the rising edge of the electrical signal) and the timing when the needle begins to be lifted (detaches from the seat thereof). In the context of the present application, this offset is referred to as the "opening delay".

Different methods are known for determining the opening delay of an injector.

It has for example been proposed in EP 2884084 to determine the opening delay of an injector from the current trace. Such a method requires an dedicated additional measurement path, and the implementation of a measurement sequence with a specific control mode.

Alternatively, U.S. Pat. No. 5,747,684 proposes the determination of the opening and closing delay of an injector from an accelerometer signal coupled to the injector. Indeed, when the actuator armature meets the actuator pole piece during opening, the impact energy causes mechanical vibrations in the structure, which can be detected by an accelerometer. This vibratory energy attenuates and the accelerometer trace decreases. On closing, a similar event occurs when the needle meets the seat. The determination of the opening and closing timings is made based on the energy contained in the accelerometer signal (signal integration). DE 102010040622 also proposes the use of the vibratory energy of an accelerometer for the determination of the injection start, or the exploitation of the phase angle of the sensor signal, or the Akaike information criterion.

The object of the invention is to provide an improved method of determining opening characteristics of an injector.

GENERAL DESCRIPTION OF THE INVENTION

The idea behind the invention lies in the use of a knock sensor, for detecting the opening timing of a fuel injector. The present inventors have indeed established that the knock sensor, which conventionally equips gasoline engines, can be used for a reliable detection of the opening timing of several injectors. The use of the knock sensor is thus diverted, upon request, to perform a measurement of the opening characteristics of the injectors.

It is therefore not necessary, as in U.S. Pat. No. 5,747,684 or DE 202013104714 U1, to put dedicated accelerometers on each injector.

According to a first aspect, the invention relates to a method of determining opening characteristics of a fuel injector in an internal combustion engine comprising an engine block with a plurality of combustion cylinders, as well as a knock sensor mounted on the engine block, capable of generating a signal representative of vibrations of the engine block, the method comprising:
  acquiring the knock sensor signal over a predetermined measurement window synchronized to an injection control signal
  analyzing the sensor signal on the measurement window to:
    determine a first alternation of a first wave train; and
    determine the local maximum of the first alternation.

The method is remarkable in that the opening characteristic of the injector is determined based on this local maximum.

Validation tests of the present method have shown that the first alternation (or first peak) of the first wave train arriving in the measurement window corresponds well to the timing when the armature comes into upper abutment in the injector, which corresponds to the timing of the actual injection start, when the needle is lifted from the seat of the injection nozzle. The corresponding local maximum time (or extremum; which can be positive or negative) of this first alternation can be validly used as related to the timing of the start of the injector opening. The first tests have shown that the precision of the present method is excellent and does not deviate by more than 5 µs from the values obtained by the reference method (measurement on a hydraulic bench).

As explained below, the present method gives access, based on a simple conventional knock sensor, to the opening characteristics such as the opening timing and the opening delay.

The knock sensor is a sensor capable of recording the vibrations of the engine block in the frequencies appropriate for the observed phenomenon. Preferably, the knock sensor is an accelerometer, in particular of the piezoelectric type. The knock sensor is mounted on the engine block; it can be fastened on the cylinder block or on the cylinder head. In three- or six-cylinder engines, one knock sensor is generally used per cylinder block. In a four-cylinder engine, one or two knock sensors can be employed, in the latter case each sensor is placed between two cylinders.

The acquired/recorded signal is analyzed on the measurement window, in which a point, will be search for, which corresponds to the opening timing of the injector. This window is synchronized relative to the injector control electrical signal. For ease of implementation, the start of the measurement window coincides with the start of the injector control signal (denoted t0). The duration of the measurement window is determined by calibration. It can have a duration between 0.6 and 1.5 ms, in particular in the order of 1 ms.

Advantageously, for the acquisition of the signal from the knock sensor in view to determine the opening characteristics, the knock sensor is configured for acquisition in a acquisition frequency range corresponding to the vibrations caused by the actuation of the injector, and therefore allowing them to be visualised, for example in the range 600 to 800 kHz.

According to one embodiment, the detection of the first alternation of the first wave train is easily done by applying a detection threshold. The first alternation which exceeds the detection threshold is therefore selected. The searched point, that is to say the time corresponding to the noise of the opening start, is then determined as the local maximum of the first alternation: this is the injector opening timing, denoted t1.

Advantageously, the opening timing t1 is corrected to take into account the distance between the sensor and the cylinder concerned. Indeed, the further away the cylinder is from the knock sensor, the longer it takes for vibrations caused by the opening to reach the knock sensor.

According to the variants, a transport time constant CT is determined for each cylinder as the intercept point of the regression line for a set of points representing, for different injectors, the injector opening timing (t1) and the corresponding reference opening timing. The reference point is typically measured on the hydraulic test bench.

The transport time constant CT is therefore used to determine the corrected opening timing $t_{corr}$ which is calculated: $t_{corr}=t1-CT$.

The opening delay can therefore be calculated as $DO=t_{corr}-t0$.

The opening delay and/or the opening timing of the injector thus determined can be advantageously employed by the vehicle calculator, in particular for injection control. The opening delay is of particular interest in calculating the duration of the injector control signal, which will influence the amount of injected fuel.

According to the variants, the present method is implemented in low load areas, e.g. a torque less than 40 N.m. Alternatively, the implementation of the present method may be accompanied by a modification of the ignition advance to avoid the knocking.

As already indicated, the method according to the invention is particularly advantageous because it allows measuring injector opening characteristics based on a knock sensor which is automatically present in spark-ignition engines. However, the present method can be transposed to diesel engines, where it will allow, after adding an accelerometer, detecting the activation of the control valve of the injector, and therefore similarly the opening start of the injector.

According to another aspect, the invention relates to a method of operating an internal combustion engine, in which the fuel injection is controlled based on an injector opening characteristic determined by means of the method described above. In general, the injector opening characteristic thus determined can be used, in a manner known per se, for calculating the injected amount of fuel or the injector opening duration, also based on the duration of the injector control signal (Pulse Width) and typically on the injector closing delay.

According to a third aspect, the invention relates to a method of operating a spark-ignition internal combustion engine, comprising an engine block with a plurality of cylinders with which respective fuel injectors are associated, and at least one knock sensor mounted on the engine block, wherein a calculator is configured to monitor the knocking based on the knock sensor signal, and wherein the calculator is configured to, at predefined intervals, use the knock sensor signal to determine an injector opening characteristic in accordance with the present method for determining opening characteristics of an injector.

Thus, the knock sensor is mainly used to monitor the quality of the combustion. The knock sensor signal is therefore, most of the time, used to calculate a knocking index which reflects the combustion of each cycle at each cylinder. The knocking signal, resp. the knocking index, is then used to determine the ignition in advance.

But, from time to time, for example at given intervals, the knocking signal is used to determine the opening delay of an injector, in accordance with the method disclosed herein. This opening delay value can then be advantageously employed in calculating the duration of the injector control signal for each combustion cycle.

DETAILED DESCRIPTION USING THE FIGURES

Other features and characteristics of the invention will emerge from the detailed description of at least one advantageous embodiment presented below, by way of illustration, with reference to the accompanying drawings. These show:

FIG. 1 a principle view of an engine equipped with a knock sensor;

FIG. 2 a graph illustrating the evolution over time of the injector control voltage and the knock sensor signal;

Figure 1:
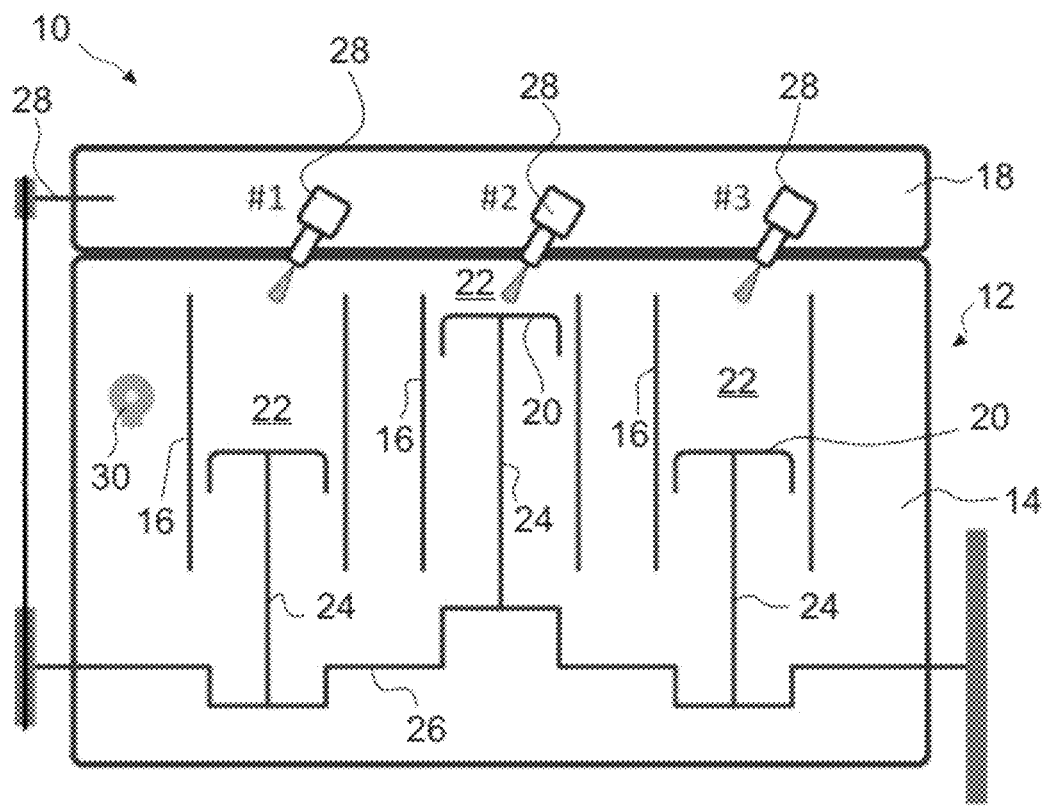

FIG. 1 schematically represents a conventional internal combustion engine 10, here of the spark ignition type. The engine block 12 comprises a cylinder block 14 with three cylinders 16 closed by a cylinder head 18. A piston is slidably mounted in each cylinder 16, the upper face of the cylinder defining with the side walls of the cylinder and the cylinder head a combustion chamber 22. The pistons 20 are each connected by a connecting rod 24 to a crankshaft 26. The crankshaft 26 is rotatably coupled to the camshaft 28 in the cylinder head 18, for the purpose of actuating the valves (not shown) mounted in the cylinder head for the entry and exit of fluids. The reference sign 28 designates injectors mounted so as to allow direct injection of fuel (gasoline or others) into the combustion chamber. An ignition plug (not shown) is also associated with each cylinder to trigger the combustion on command. The engine comprises a vehicle calculator 29 (ECU) programmed to control the operation of the engine and particularly to manage the combustion, in particular via the fuel injection control and the ignition timing.

As known, in an internal combustion engine, the combustion of the air/gasoline mixture normally begins after the spark generated by the plug. The flame front propagates and its blast pushes a part of the mixture against the walls of the cylinder and the top of the piston. The rise in pressure and temperature is sometimes large enough for the unburned mixture to reach its self-ignition point and self-ignite in one or more places. This phenomenon is called "knocking". Knocking is primarily an abnormal combustion phenomenon in spark ignition engines, noticeable externally by a metallic noise coming from the engine which results from the appearance of pressure waves in the combustion chamber. These parasitic explosions produce vibrations in the acoustic domain and beyond (typically of the range of 5 to 80 KHz). They are very strong and can quickly lead to a localized heating. Over time, the knocking leads to damage to the metal of the piston and/or the walls of the cylinder and the segments. The knocking can therefore ultimately lead to the destruction of engine components. The estimation of knocking provides a combustion control that limits the knocking effect and does not damage the engine. For this purpose, the engines are conventionally equipped with a knock sensor mounted on the engine block. In FIG. 1, a knock sensor 30 is fastened to the cylinder block 14.

The knock sensor 30 is for example an accelerometer, in particular of the piezoelectric type. Conventionally, such a sensor is screwed onto the engine block. It comprises a piezoelectric transducer for detecting detonation vibrations, which are typically transmitted thereto via a seismic mass arranged in the box between the transducer and a part linked to the engine.

The knock sensor therefore emits electrical signals generated by the vibrations of the cylinder block, during each combustion cycle. These signals are transmitted to the calculator, which filters the frequencies which do not relate to the detonation vibration frequencies. Also, the signal is only considered over a predetermined measurement window, defined for a part of the combustion cycle (crankshaft angle), which corresponds to the ignition/combustion phase. A knocking value is calculated, and compared to a threshold.

The knock sensor thus allows checking, for each combustion cycle, the presence or absence of knocking.

On a three- or four-cylinder gasoline engine, a knock sensor is sufficient to measure the knocking on the differents cylinders, since the combustions are offset. For more precision in a 4-cylinder engine, two knock sensors can be mounted, placed between the first two and the last two engines. In a 6-cylinder V engine, a knock sensor can be used on each cylinder block.

The present invention takes advantage of the conventional knock sensor for determining opening characteristics of the injectors, in particular for detecting the opening timing of the injector as well as the opening delay.

Indeed, the actuation (opening/closing) of a fuel injector generates a noise which is detectable by the knock sensor, as explained in the introductory part. The injector noise is generally present over a wide frequency band (white noise) and over a frequency range of interest for the combustion analysis.

Figure 2:
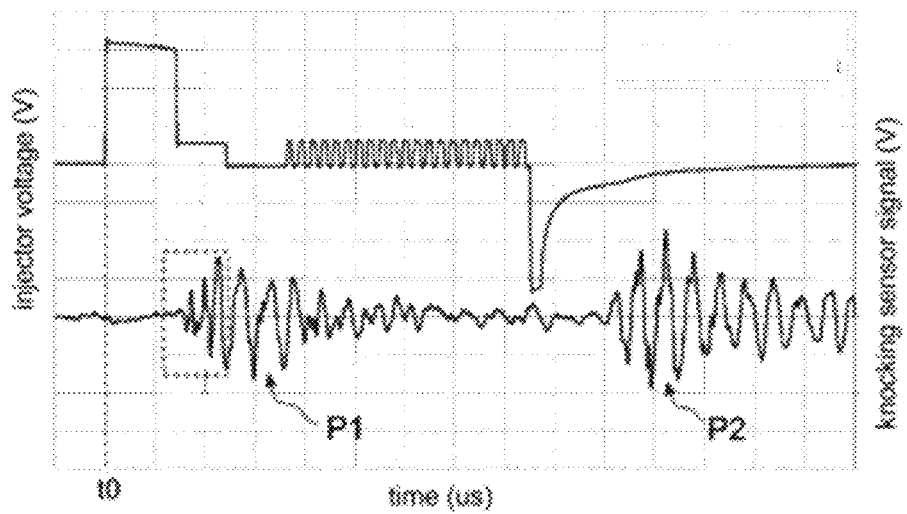

The graph in FIG. 2 comprises, in its upper part, the trace of the injector control signal (voltage) applied to an injector in a cylinder, and in its lower part, the corresponding trace of the knock sensor signal. The control signal is of conventional form: it starts with a step to take off the injector needle and then continues with a sequence of oscillations which aim to keep the needle in the open position. The start of the rising edge of the control signal, which corresponds to the injection start logic signal, is denoted to.

As known, feeding the injector solenoid actuator generates an electric field which attracts an armature controlling the opening force on the needle. When the armature comes to the end of its travel, it abuts against the structure of the injector, typically against a pole piece, which generates a so-called opening noise. The vibrations of the opening noise propagate through the engine block and are recorded by the knock sensor, resulting in the first wave train, denoted P1, observed on the sensor trace. The term wave train, or even packet, here designates the series of oscillations of the signal representing waves arriving chronologically on the sensor, therefore between a start and an end.

When the injector closes, the impact of the needle on its seat generates a closing noise, which produces the second wave train P2.

In accordance with the present method, the conventional engine knock sensor is used to determine the opening timing of the injector.

As the opening noise occurs as a consequence of the opening control signal, the knock sensor signal is recorded on a measurement window set with respect to the start of injection, and the start of which preferably coincides with the start of the rising edge, i.e. to t0 on the graph. The duration of the measurement window is predefined, preferably taking into account other engine events. The duration of the measurement window may for example be of the order of 1 ms.

Figure 3:
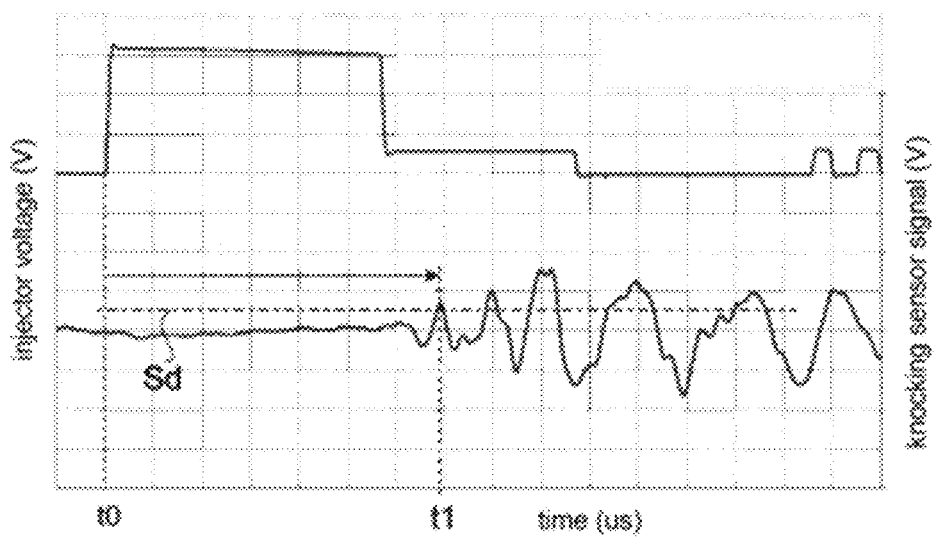
FIG. 3 is a detail of FIG. 2.

The measurement signal obtained for this measurement window is advantageously acquired with a high frequency, for example between 600 kHz and 800 kHz. A low-pass filter is then advantageously applied to smooth the signal. It is this filtered signal that is shown in FIGS. 2 and 3.

According to the present method, it is considered that the first alternation of the first wave train after the time t0 is due to the opening of the injector, and that the local maximum of this alternation corresponds to the opening timing of the injector.

In practice, this point can be detected in a simple manner by applying a detection threshold Sd, and by determining the time corresponding to the local maximum of the first alternation above the threshold after the measurement window start (t0). This is illustrated in FIG. 3.

The detection threshold Sd is a value calibrated for each cylinder, so as to eliminate the background noise after starting the injection. In practice, according to the engine configuration, the first alternation of the first wave train can be positive or negative. Thus the detection threshold can be positive or negative. The calibration of the threshold Sd can consist of an optimization per cylinder with several injectors (e.g 3 or more), in order to seek the best compromise between the elimination of the noise before the wave and the detection of the first peak.

The timing corresponding to the opening is the first local maximum, denoted t1, which follows the crossing of the threshold Sd.

The horizontal arrow in FIG. 3 represents the delay between the start of the injection control signal and the timing of detection of the needle lift (start of injection).

It should be noted that the time t1 determined above is biased by the reaction time of the knock sensor and by the transport time of the waves between the cylinder concerned (#1, #2 or #3) and the knock sensor 30. When the knock sensor 30 is placed at one end of the cylinder block, as in FIG. 1, it will be understood that the wave transport time is greater for cylinder 2 than for cylinder 1, and even more for cylinder 3.

It is therefore desirable to apply a correction which takes into account the distance between the sensor and the cylinder concerned. The principle of this correction is explained below.

Figure 4:
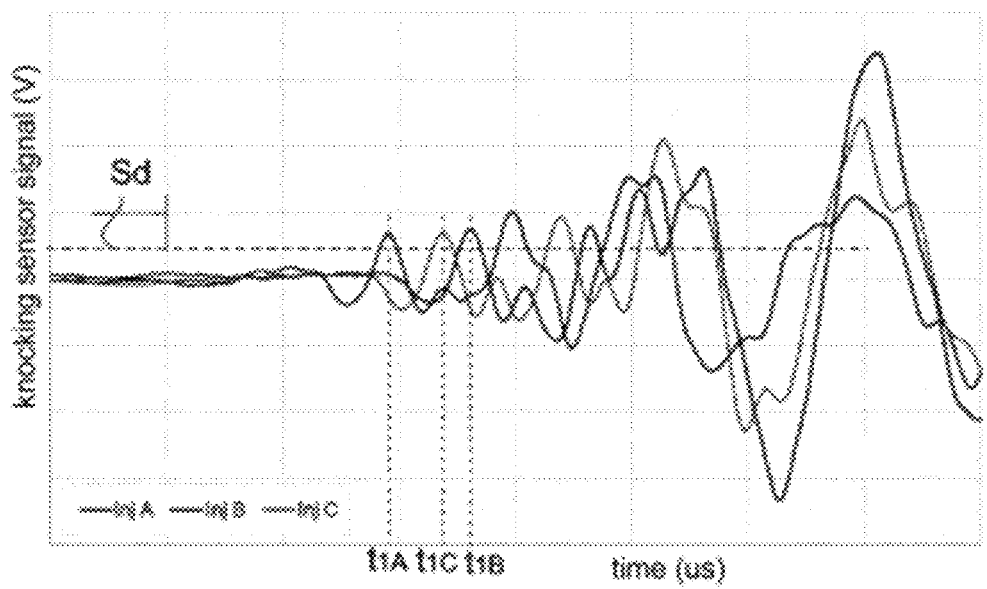
FIG. 4 is a graph representing the knock sensor signal as a function of time, around the start of the first wave train.

FIG. 4 is a graph which represents the traces of the knock sensor 30 for the injectors A, B and C, on the same cylinder (here cylinder 1). These three injectors were selected on a specific hydraulic test bench (system with cylinder pressure measurement) for their different opening times.

This is well reflected in the graph, where we can observe three different opening timings, denoted t1A, t1B and t1C. Each time, the opening timing is identified as the first local maximum following the crossing of the detection threshold Sd.

Figure 5:
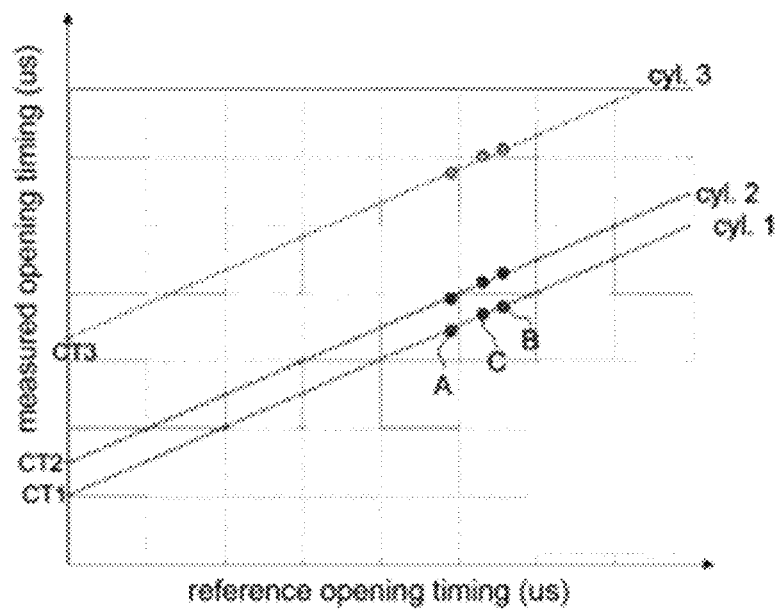
FIG. 5 is a graph illustrating the correlation between the raw opening timing determined based on the knock sensor signal and the opening time measured on the bench.

FIG. 5 is a graph which comprises on the abscissa the reference injector opening delay and on the ordinate the opening delay t1 determined according to the method described above. This graph therefore establishes a correlation between the opening delays t1 which are raw delays measured using the knock sensor, that is to say t1A, t1B and t1C, and the reference opening times of these same injectors, which are determined on the test bench, and this for each of the engine cylinders (1, 2 and 3). It should be noted that on the test bench the opening timings are determined with precision and therefore considered as the reference.

For each of the cylinders, a linear correlation between the three points is observed. The intercept point of the regression line, for each cylinder, is then determined.

Indeed, for each cylinder, what differentiates the values obtained for the opening timing is related to the opening delay of the injector. The transport time per cylinder is the same. By making this linear correlation assumption, the intercept point represents the contribution of the transport (and sensor reaction) time in the measured opening timing value. The intercept point is therefore a transport time constant, denoted CT.

For each cylinder we can therefore calculate the corrected opening timing t1corr as: t1corr=t1−CT And the opening delay can be calculated as OD=t1corr−t0.

Of course, if we have t0=0, then we have directly OD=t1−CT.

The calculator 29 can be programmed to implement the present method in order to determine the opening delay of the injector. The knock sensor signal is then used for the determination of the injector opening delay, instead of the knocking index. The new calculated opening delay value is then updated in the calculator, and can be used in the injection control, in particular for the calculation of the duration of the injector control signal.

The timings at which the calculator implements the present method can be predefined, at regular or irregular intervals. The present method is preferably implemented in low load/torque areas, e.g. less than 40 n.m.

The invention claimed is:

1. A method of operating an internal combustion engine comprising an engine block with a plurality of combustion cylinders and associated injectors, as well as a knock sensor mounted on the engine block, the knock sensor being capable of generating a knock sensor signal representative of vibrations of the engine block, wherein fuel injection is controlled based on an injector opening characteristic determined via a determination method comprising:
   acquiring the knock sensor signal over a predetermined measurement window synchronized on an injection control signal;
   analyzing the knock sensor signal on the predetermined measurement window to:
      determine a first alternation of a first wave train; and
      determine the local maximum of the first alternation,
   wherein the injector opening characteristic is determined based on this local maximum, the knock sensor signal being configured for the acquisition in a frequency range corresponding to the vibrations caused by the actuation of the injector, the acquisition being in the frequency range 600 to 800 kHz.

2. The method according to claim 1, wherein a detection threshold is applied, and the first alternation which exceeds the detection threshold is selected.

3. The method according to claim 1, wherein the local maximum of the first alternation is defined as the injector opening timing.

4. The method according to claim 3, wherein the injector opening timing is corrected to take into account the distance between the knock sensor and the corresponding cylinder.

5. The method according to claim 4, wherein an opening delay is calculated as the difference between the corrected, injector opening timing and the timing of the start of the injection control signal.

6. The method according to claim 4, wherein a transport time constant for each cylinder is determined as the intercept point of the regression line for a set of points representing, for different injectors, the injector opening timing and the corresponding reference opening timing.

7. The method according to claim 1, wherein the start of the measurement window coincides with the start of the injector control signal.

8. The method according to claim 7, wherein the measurement window has a duration between 0.6 and 1.5 ms.

9. The method according to claim 1, wherein the knock sensor comprises an accelerometer.

10. The method according to claim 1, wherein said acquisition of the knock sensor signal over a predetermined measurement window is performed when the engine is operating in a low load area with a torque less than 40 N·m.

11. A method of operating a spark-ignition internal combustion engine, comprising an engine block with a plurality of cylinders with which respective fuel injectors are associated, and at least one knock sensor mounted on the engine block, wherein a calculator is configured to monitor the knock based on the knock sensor signal, and wherein the calculator is configured to implement the operating method according to claim 1 using, at predefined intervals, the knock sensor signal to determine the injector opening characteristic.

12. The method according to claim 11, wherein the calculator is configured to:
   determine the ignition advance based on a knock index determined based on the knock sensor signal; and
   determine the duration of the injector control signal based on an opening delay determined based on the method of determining opening characteristics of an injector.

* * * * *